(12) United States Patent
Noble et al.

(10) Patent No.: US 10,223,393 B1
(45) Date of Patent: Mar. 5, 2019

(54) EFFICIENT PROCESSING OF SOURCE CODE OBJECTS USING PROBABILISTIC DATA STRUCTURES

(71) Applicant: Amazon Technologies, Inc., Seattle, WA (US)

(72) Inventors: Matthew Roy Noble, Seattle, WA (US); Wade Alvin Matveyenko, Redmond, WA (US); Yilun Cui, Seattle, WA (US); Clare Emma Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 14/750,925

(22) Filed: Jun. 25, 2015

(51) Int. Cl.
*G06F 7/00* (2006.01)
*G06F 17/30* (2006.01)

(52) U.S. Cl.
CPC .. *G06F 17/30321* (2013.01); *G06F 17/30312* (2013.01); *G06F 17/30424* (2013.01)

(58) Field of Classification Search
CPC ......... G06F 17/30321; G06F 17/30312; G06F 17/30424; G06F 17/30696; G06F 17/30616; G06F 17/30628; G06F 12/10
See application file for complete search history.

(56) References Cited

U.S. PATENT DOCUMENTS

| | | | | |
|---|---|---|---|---|
| 6,928,526 | B1* | 8/2005 | Zhu | G06F 3/0608 711/118 |
| 7,330,870 | B1* | 2/2008 | Davis | H04L 65/607 709/200 |
| 8,396,839 | B1* | 3/2013 | Huang | G06F 17/30156 707/664 |
| 8,726,264 | B1 | 5/2014 | Allen et al. | |
| 8,959,484 | B2 | 2/2015 | Pinnix | |
| 8,977,776 | B1* | 3/2015 | Lee | H04L 67/32 709/231 |
| 9,229,693 | B1 | 1/2016 | Batni et al. | |
| 2004/0168165 | A1 | 8/2004 | Kokkinen | |
| 2007/0061782 | A1 | 3/2007 | Schreiner et al. | |
| 2009/0210852 | A1 | 8/2009 | Martineau | |
| 2010/0153324 | A1* | 6/2010 | Downs | G06F 17/2745 706/21 |
| 2011/0119653 | A1 | 5/2011 | Culpepper | |
| 2011/0173618 | A1 | 7/2011 | Laborczfalvi et al. | |
| 2013/0174124 | A1 | 7/2013 | Watters et al. | |
| 2013/0268962 | A1* | 10/2013 | Snider | H04N 21/8547 725/32 |
| 2016/0103881 | A1* | 4/2016 | Gukal | G06F 17/30554 707/722 |

(Continued)

*Primary Examiner* — Azam M Cheema
(74) *Attorney, Agent, or Firm* — Davis Wright Tremaine LLP

(57) ABSTRACT

A computing resource service provider may operate a build service configured to store data object on behalf of a customer of the computing resource service provide. The build service may receive a stream of data objects including object objects that reference one or more other data objects. A Bloom filter may be used to determine whether a one or more referenced data objects have been previously processed by the build service. This may enable the build service to reorder processing of the data object based at least in part on whether the one or more referenced data objects have previously been processed by the build service.

20 Claims, 7 Drawing Sheets

(56) References Cited

U.S. PATENT DOCUMENTS

2016/0139914 A1    5/2016  Levi et al.
2016/0283556 A1*   9/2016  Varakin ............. G06F 17/30519
2017/0316455 A1*  11/2017  Fichter ............... G06Q 30/0246

* cited by examiner

US 10,223,393 B1

EFFICIENT PROCESSING OF SOURCE CODE OBJECTS USING PROBABILISTIC DATA STRUCTURES

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers, online merchants and developers, who traditionally used on-site servers and storage equipment to host their websites and store and stream content to their users, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs.

In addition, various software development projects (e.g., application developed by content providers, online merchants and developers) may have multiple contributors modifying source code associated with the software development project at any given time. Furthermore, other software development projects may require collaboration between multiple software development teams which may be geographically disbursed from one another and/or the computing resources of the service provider. Software development projects may also contain software code, data objects, compressed data objects, and encoded data objects that may be distributed over geographically distinct computer system. As a result processing of the software development project may take a very long time (often on the order of hours or longer) to build on a software developer's personal computer or other computing resource accessible to the software developer. These problems may lead to delay and inefficiencies in the software development cycle. Software developers may mitigate some of these problems by purchasing high-power servers and other computing resources to reduce processing time but this can be extremely expensive and difficult to do at scale. Furthermore, these high-power servers may remain idle between processing software projects, remaining under-utilized for long periods of time.

BRIEF DESCRIPTION OF THE DRAWINGS

Various embodiments in accordance with the present disclosure will be described with reference to the drawings, in which.

DETAILED DESCRIPTION

Figure 1:
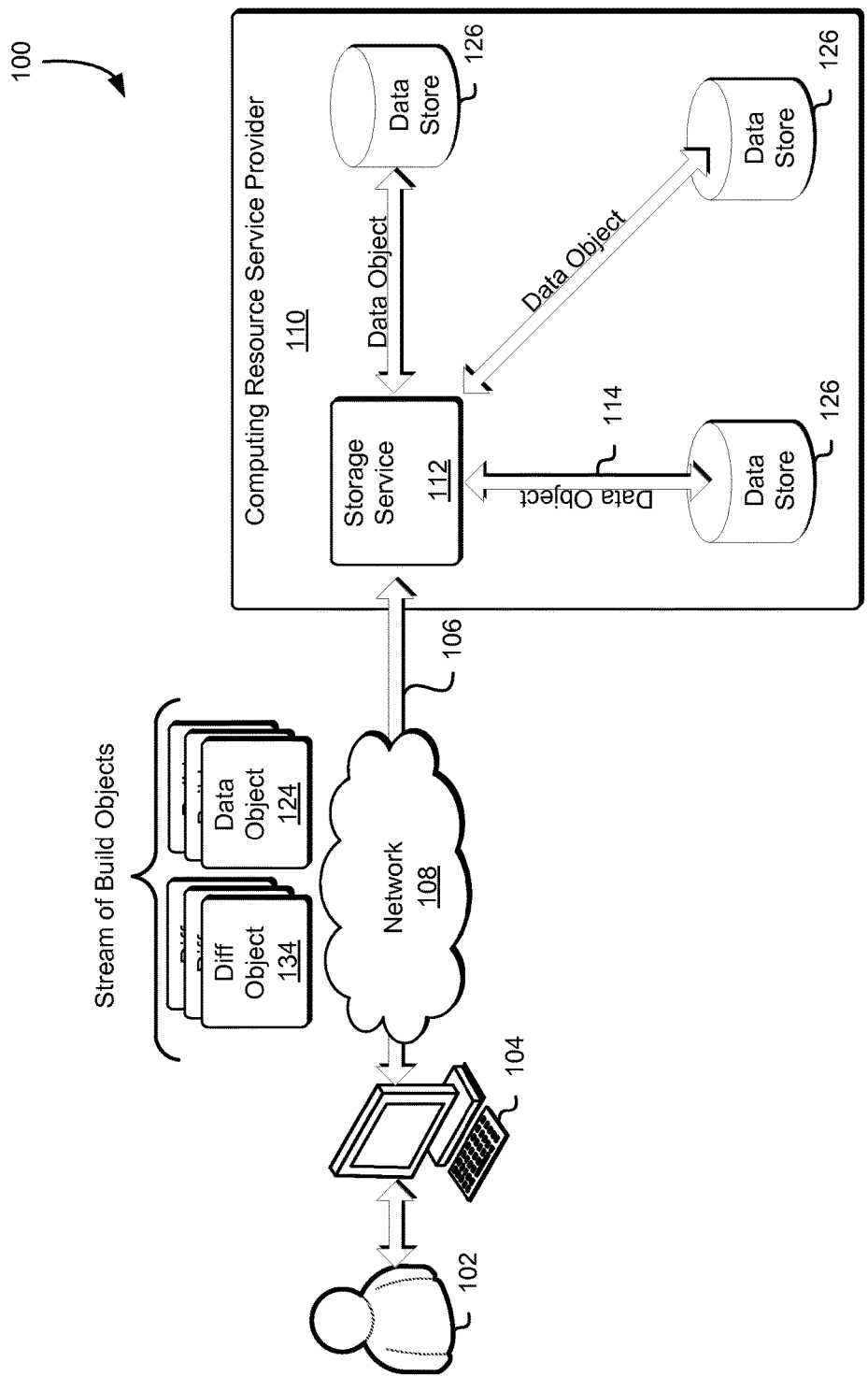
FIG. 1 is an environment illustrating a build service configured to store data object of a software development project in a distributed data store on behalf of a customer in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements to software development services offered by a computing resource service provider. Computing resource service providers may offer a variety of services using computing resources operated by the computing resource service provider, the services may be utilized by software developer (also referred to as simply developers) to enable development and collaboration on various software development projects. For example, software developers may utilize the service provider's virtual computing service and build service to operate virtual computing instances executed on computing resources of the computing resource service provider in order to generate and build software projects. Furthermore, the service provider may provide developers with a management console or similar interface, exposed to the developer as a webpage, to enable simple and efficient management of software development projects.

Further, the build service may store data objects associated with a software development project using remote data stores on behalf of the customer. In various embodiments, the remote data stores are operated by a remote data storage service implemented by the computing resource service provider. During storage operations the build service may receive an unordered stream of data objects associated with the software development project from a computer system operated by the customer, the data objects may include source code files, compilation artifacts, binary diff objects, compressed objects, encoded objects including delta encoded objects, or any other data object suitable for use with a distributed revision control system such as Git®. The data objects may further depend on other data objects included in the software development project. For example, a particular data object may be a binary diff of another data object which may in turn be a binary diff of another data object. In constructing and/or storing the software development project the build service may be required to process the binary diff data objects in order to create complete data object from the binary diff data objects.

Furthermore, in various embodiments, customers may generate an identifier for a particular data object which may be used by the customers to obtain the particular data object from the remote storage service and/or the build service. The build service may require the complete data object (e.g., the data object not including any binary diff data objects, delta compression data objects, or any other data object that depends on another data object) to calculate and/or determine the data object identifier that is useable by the customer to obtain the data object from the build service and/or remote data storage as described above. Since the stream of data objects obtained from the customer is unordered data objects that depend from another data object (e.g., a binary diff data object) may be received prior to the data object from which they depend. As a result, the build service may delay processing of the data objects that depend from another data object.

The build service may utilize a Bloom filter or other probabilistic data structure to determine whether a data object referenced by another data object has already been processed by the build service and therefore can be used to generate a complete data object. For example, a particular binary diff data object may depend on data object 'X,' the build service may use a Bloom filter to determine if data object 'X' has previously been received and process by the build service either in the stream on data object or during a previous customer interaction with the build service. The build service may also maintain an authoritative repository configured to manage information corresponding to data objects associated with a particular software development project or software development projects processed by the build service. The authoritative repository may be used to generate the Bloom filter useable in determining whether a referenced data object has previously been processed by the build service. In this way, the build service may process complete data objects in a stream prior to processing data objects that depend on one or more other data objects, such as binary diff data object described above.

FIG. 1 illustrates an example environment 100 where one or more computing systems, as well as the associated code running thereon, may be used to perform one or more commands associated with processing a stream of data objects associated with a software development project in accordance with an embodiment. The stream of data objects may include a variety of data objects resulting from generating source code of a software development project such as an executable, a software library, a binary file, an error log, a test result, additional source code, a configuration file, a build description, binary diff of a data object, compressed data object, or any other data object resulting from a computing system performing one or more operations on source code of the software development project. For example, the stream of data objects may include source code files including binary diffs of source code files generated by a developer 102. The stream of objects may include an unordered set of diff objects 134 and data objects 124. The diff objects 134 may include any data object that references one or more other data objects 124. For example, a particular diff object 134 may be a delta encoding of another data object 124. The data objects 124 may include any data object associated with a software development project as described above.

The developer 102 (which may also include a customer of the computing resource service provider 110) may connect 106 to a build service 112 through a computer system client device 104 and may initiate a connection with and/or interaction with one or more computing resources under the control of the build service 112 or a computing resource service provider 110. The computer system client device 104 may include personal computers, cell phones, handheld messaging devices, laptop computers, tablet computers, personal data assistants, embedded computer systems, electronic book readers, and the like. The build service 112 may be operating within the computing resource service provider 110 environment or may be at least partially hosted on resources outside of the computing resource service provider 110 environment. For example, the build service 112 may interact with a code repository maintained by the developer 102 or another service provider. The computing resource service provider 110 may also operate one or more data stores 126. The data stores 126 may be a collection of storage devices, such as block level storage devices, hard disk drives, solid state drives, or other storage devices configured to store data objects including diff objects 134 and data objects 124 associated with a software development project managed by the build service 112. In various embodiments, the data stores 126 are managed by a remote data storage service described in greater detail below.

In some embodiments, the computing resource service provider 110 may provide a distributed, virtualized and/or datacenter environment within which one or more applications, processes, services, virtual machines and/or other such computer system entities may be executed. In some embodiments, the developer 102 may be a person, an entity associated with an organization, or may be a process running on one or more remote computer systems, or may be some other computer system entity, user, or process. The command or commands to connect to and/or interact with the build service 112 may originate from an outside computer system and/or server, or may originate from an entity, user, or process on a remote network location, or may originate from an entity, user, or process within the computing resource service provider 110, or may originate from a user of the computer system client device 104, or may originate as a result of an automatic process or may originate as a result of a combination of these and/or other such origin entities. For example, the computer system client device 104 may be a virtual computer system instance executed on computing resources of the computing resource service provider 110 and operated by the developer 102.

In some embodiments, the command or commands to initiate the connection 106 to the computing resource service provider 110 may be sent to the build service 112, without the intervention of the developer 102. For example, the developer 102 may edit source code associated with a particular software development project using the computer system client device 104 and the build service 112 may automatically obtain the stream of data objects corresponding to the developer 102 edited source code, either once the developer 102 has finished editing the source code or automatically (e.g., without intervention by the developer 102) as a result of an operation performed by the computer system client device 104. The command or commands to initiate the connection 106 to the build service 112 may originate from the same origin as the command or commands to connect to the computing resource service provider 110 or may originate from another computer system and/or server, or may originate from a different entity, user or process on the same or a different remote network location, or may originate from a different entity, user or process within the computing resource service provider, or may originate from a different user of a computer system client device 104, or may originate as a result of a combination of these and/or other such same and/or different entities.

The developer 102 may request connection to the computing resource service provider 110 via one or more connections 106 and, in some embodiments, via one or more networks 108 and/or entities associated therewith, such as servers connected to the network, either directly or indirectly. The computer system client device 104 that may request access to the build service 112 may include any device that is capable of connecting with a computer system via a network, including at least servers, laptops, mobile devices such as smartphones or tablets, distributed computing systems and components thereof, abstracted components such as guest computer systems or virtual machines and/or other types of computing devices and/or components. The network may include, for example, a public network such as the Internet, a wide-area network, a wireless network or a mobile network. The network may also operate in accordance with various protocols, such as those listed below, WiFi, cellular network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. For example, the computing resource service provider 110 may provider the developer 102 to access to one or more computing services configured to manage, generate, tear down or otherwise operate one or more computing resources on behalf of the developer 102 required to generate and store data objects corresponding to particular software development project. The data objects may be components of a source code repository or other revision control system operated by the build service 112.

The computing resource service provider 110 may also provide access to computer system resources such as user resources, policy resources, network resources, computing resources and/or storage resources. For example, the computing resource service provider 110 may provider the developer 102 with access to a policy server in order to control access and/or access levels of particular users and/or services to at least a portion of the data associated with the software development project. The policy server may be configured to generate a token configured to enable the build service 112 to access the data store 126 in order to obtain the source code necessary to build complete data objects 124 from diff objects 134. In some distributed and/or virtualized computer system environments, the resources associated with the computer services may be physical devices, virtual devices, combinations of physical and/or virtual devices or other such device embodiments. For example, the build service 112 may include a combination of virtual computing devices and associated physical devices. In some embodiments, the host machines, executing the build service 112, may be physical machines located within the computer system environment.

The connection 106 may be used to issue one or more commands to perform one or more operations associated with the stream of data objects. The build service 112 and/or component thereof may utilize one or more Bloom filters, described in greater detail below, to order the processing and/or operations performed on the diff objects 134 and data objects 124 included in the stream of data objects prior to storing the stream of object in the data stores 126. By ordering the diff objects 134 and data objects 124 included in the stream of data objects the build service may generate complete data objects from the diff objects 134 and data objects 124 included in the stream of data objects prior to storage operations. The build service may establish one or more connections 114 to provide data objects for storage in the data store 126. In various embodiments, the connect 114 is established between the build service 112 and a remote data storage service described in greater detail below.

Figure 2:
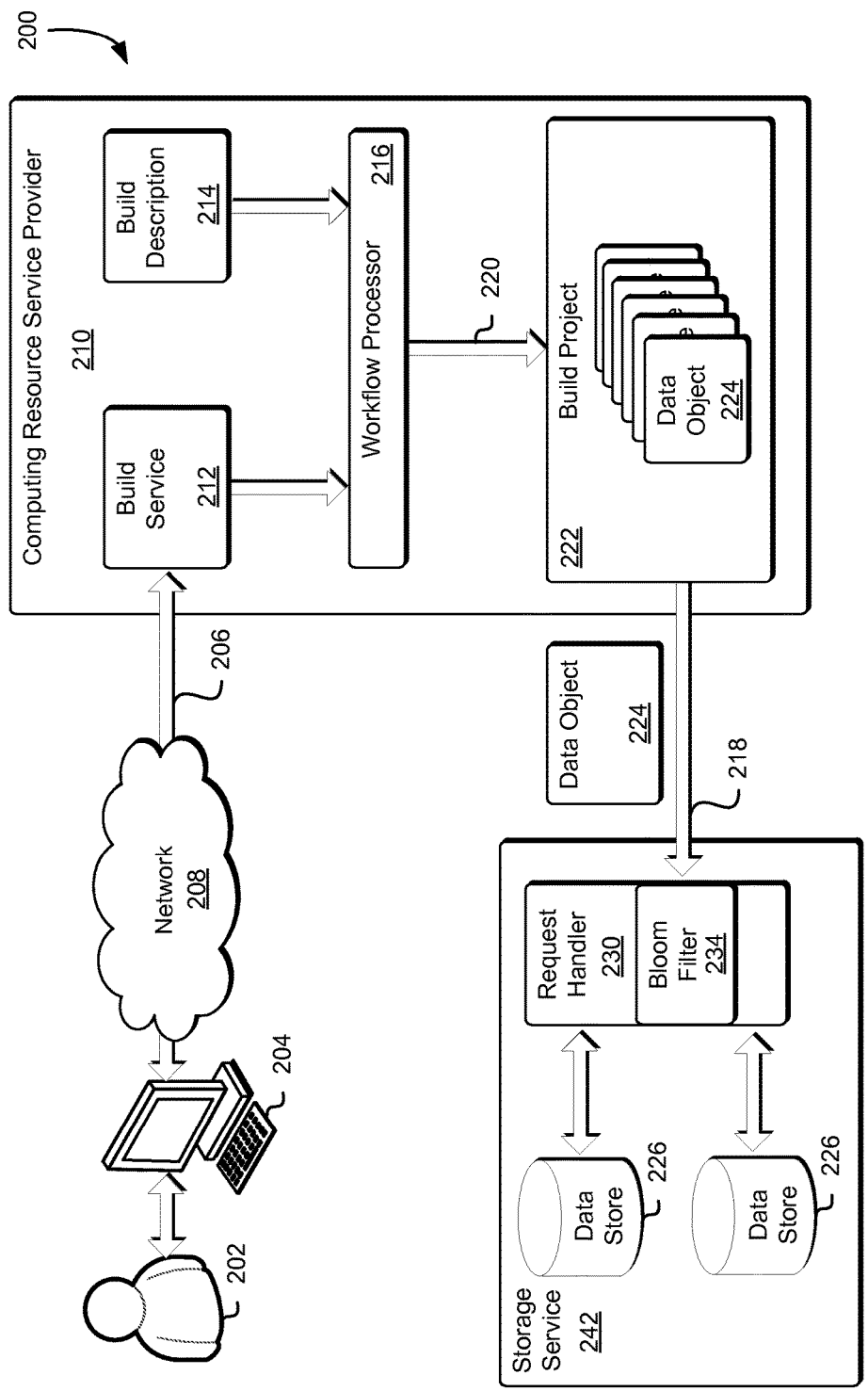
FIG. 2 is an environment illustrating a build service storing data objects with a remote storage service using a Bloom filter to determine whether the data object has previously been processed in a stream of data objects in accordance with an embodiment.

FIG. 2 illustrates an example environment 200 where a Bloom filter 234 may be used to optimize processing and/or storage of a set of data objects 224 of a build project 222 corresponding to a software development project in accordance with an embodiment. A developer 202 may connect 206 to a build service 212 through a computer system client device 204 and may initiate a connection with and/or interaction with one or more computing resources under the control of the build service 212 or a computing resource service provider 210. The build service 212 may be operating within the computing resource service provider 210 environment or may be at least partially hosted on resources outside of the computing resource service provider 210 environment. The build service 212 may provide developers 202 with a source code repository of other version control system for software development projects. In various embodiments, the developer 102 connect directly with a storage service 242 in order to store various data objects, such as source code files and binary diffs, as described above. The storage service 242 may include one or more computing resources under the control of the build service 212 or a computing resource service provider 210.

The computing resource service provider 210 may implement the storage service 242 configured to provide block-level and/or on-demand storage for developers 202 and other customers of the computing resource service provider 210. The storage service 242 may be a collection of computing resources configured to synchronously process requests to store and/or access data on one or more block-level storage devices or other suitable devices for storing data objects including data objects as described above. The storage service 242 may operate using computing resources (e.g., databases) that enable the storage service 242 to locate and retrieve data quickly, so as to allow data to be provided in response to requests for the data. For example, the storage service 242 may maintain stored data in a manner such that, when a request for a data object is retrieved, the data object can be provided (or streaming of the data object can be initiated) in a response to the request. For example, the storage service 242 or components thereof, such as data stores 226, may be configured to stream data objects as described above. In some embodiments, at least a portion of the computing resources of the storage service 242 including the data stores 226 may be operated by the build service 212.

As noted, data stored in the storage service 242 may be organized into data objects including data objects 224 generated at least in part by interactions of the developer 202 with the build service through the client computing system 204. The data objects 224 may have arbitrary sizes except, perhaps, for certain constraints on size. Thus, the storage service 242 may store numerous data objects 224 of varying sizes. The storage service 242 may operate as a key value store that associates data objects 224 with identifiers of the data objects 224 which may be used by the developer 202 to retrieve or perform other operations in connection with the data objects stored by the storage service 242.

As described above, the client computing system 204 may calculate an identifier (e.g., key value) for each data object. However, the identifier may be based at least in part on the completed data object. Furthermore, the data objects 224 may be compressed or encoded to reduce the amount on network traffic transmitted to the storage service 242. For example, the build service 212 or client computing device 204 (which may include virtual computing system instances provided by the computing resource service provider 210) may perform delta encoding on the data objects 224 thereby generating data object which reference at least one other data object and require all references data objects in order to generate a complete data object from the delta encoded data object. As a result, the storage service 242 or build service 212 may need to generate a complete data object from a diff object in order to calculate the identifier used by the storage service 242 to enable the developer 202 or other user to retrieve the data object 224.

The storage service 242 may contain one or more data stores 226 configured to store data objects 224 as described above. The one or more data stores 226 may be virtual or physical storage devices such as hard disk drives. In order to enable access to data objects 224 stored in the one or more data stores 226, the storage service 242 may contain a request handler 230. The request handler 230 may include a web-server frontend, service frontend, or other computer system configured to interface with one or more other computer systems. The request handler 230 may maintain the key value store responsible for associating the data objects 224 with identifiers of the data objects 224. For example, the request handler 230 may receive a request from the computer system client device 204 including an identifier of a particular data object. The request handler 230 may then retrieve the particular data object based at least in part on the identifier and provide the particular data object in response to the request.

Furthermore, the request handler 230 may obtain one or more Bloom filters 234 from a filter repository or other storage location described in greater detail below. The request handler 230 may use the Bloom filters 234 to determine whether a particular data object referenced by a diff object, such as a binary diff, has been previously processed. The request handler 230, in some embodiments, uses the one or more Bloom filters 234 and/or other probabilistic data structures (e.g., hash map), combination of database and one or more Bloom filters 224 and/or other probabilistic data structures, or otherwise in order to determine whether a particular data object referenced by a diff object, such as a binary diff, has been previously processed. A probabilistic data structure may include any data structure configured such that, when maintained correctly, a query against the data structure (e.g., whether an element is in a set) has a non-zero probability of being incorrect (e.g., due to a hash collision). For example, the build service 212 or other computer system responsible for maintaining the Bloom filters 234 may pass data objects 224 through the Bloom filter 234. When processing diff objects the request handler 230 may pass information corresponding to data objects referenced by the diff object through the Bloom filters 234 in order to determine whether the referenced data objects have been previously processed by the request handler 230.

The connection 206 may be used to issue one or more commands to perform one or more operations associated with the build description 214 and/or an existing build project 222. For example, operations may be issued from the build service 212 to be executed 220 by a workflow processor 216 to create the build project 222 described in the build description 214 in response to a command from the developer 204 to generate the set of data objects 224. In such an example, the workflow processor 216 may cause one or more data objects 224 associated with the build description 214 to be created for use with the build project 222. The build project 222 may include a compilation artifact or resultant of the workflow processor 216 processing source code associated with a software development project. In various embodiments, the data object 224 are already created and stored on computing resources of the computing resource service provider 210 and the build service 212 makes the data object 224 available to the storage service 242. The workflow processor 216 may include compiler or other tool configured to generate data objects from source code.

Once received by the storage service 242, the request handler 230 may generate an identifier of the data objects 224 and provide the identifier to the build service 212 or other service of the computing resource service provider 210. In various embodiments, the storage service may be configured to provide the identifier of the data objects 224 directly to the developer 202. For example, the build service 212 may transmit a request to the storage service 242 to store the data objects, and the request may contain a stream of data objects 224 and information configured to identify the developer 202 and/or software development project such that the storage service 242 may transmit to the developer 202 an indication of the identifier of the data objects 224. In another example, the build service 212 may receive the identifier of the data objects 224 and may provide the identifier to the developer 202 over connection 206. The developer 202 may then obtain the data objects 224 from the storage service 242 based at least in part on the identifier of the data objects 224 over connection. The identifier of the data objects may be a reference to information configured to provide a location of the compilation artifact such as a uniform resource locator (URL) or uniform resource identifier (URI).

Figure 3:
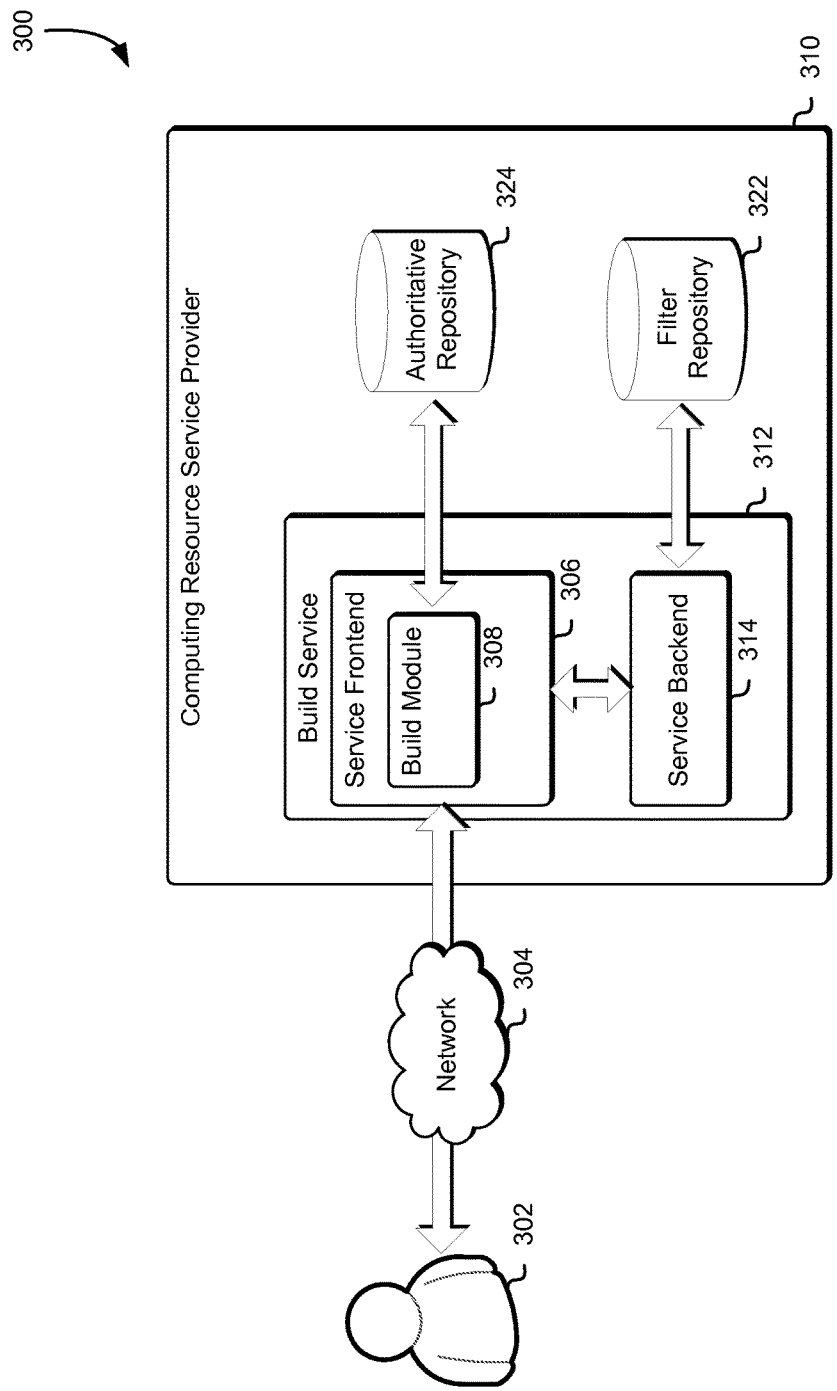
FIG. 3 is an environment illustrating a build service configured to maintain a filter repository useable to determine whether the data object has previously been processed in a stream of data objects in accordance with an embodiment.

FIG. 3 is an illustrative example of an environment 300 in which a distributed computer system may utilize the various techniques described herein. In an embodiment, a developer 302 may use a computing device to communicate over a network 304 with a computing resource service provider 310. Communications between the computing resource service provider 310 and the developer 302 may, for instance, be for the purpose of accessing a build service 312 operated by the computing resource service provider 310, which may be one of many services operated by the computing resource service provider 310. The build service 312 may comprise a service frontend 306 and a service backend 314. The developer 302 may, through an associated computing device, issue a request for access to a build service 312 (and/or a request for access to resources associated with the build service 312) provided by a computing resource service provider 310. The request may be, for instance, a web service application programming interface request.

The developer 302 may be a user, or a group of users, or a role associated with a group of users, or a process representing one or more of these entities that may be running on one or more remote (relative to the computing resource service provider 310) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The developer 302 may communicate with the computing resource service provider 310 via one or more connections (e.g., transmission control protocol (TCP) connections). The developer 202 may use a computer system client device to connect to the computing resource service provider 310. The client device may include any device that is capable of connecting with a computer system via a network, such as example devices discussed below. The network 208 may include, for example, the Internet or another network or combination of networks discussed below.

The computing resource service provider 310, through the build service 312, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the build service 312 may be received by a service frontend 306, which, in some examples, comprises a web server configured to receive such requests and to process them according to one or more policies associated with the build service 312. The request for access to the build service 312 may initiate streaming or otherwise transmitting data objects to the service frontend. The data objects may be processed by a build module 308 and split up into chunks or sets of data objects to be processed by the service back end 214. The build module 308 may be an application or other computer executable logic that, when executed by one or more processors of a computing system, cause the build service 312 to process requests. The request may be a request to generate and/or store data object corresponding to a software development project. For example, the request may be request to push a particular version of a software development project to a web service frontend for execution.

The service frontend 306 may then transmit commands, such as storage calls, to the service backend 314 based at least in part on the data objects obtained from the stream of data objects. The storage calls may be asynchronous and may include a particular chunk or a particular set of data objects, obtained from the build module 308, to be stored or otherwise processed by the build service. For example, in order to fulfill the storage call the build service 312 may generate complete data object from diff objects as described above. Furthermore, the data objects included in the storage call may be diff objects (e.g., may be binary diffs or delta encodings of other data objects included in the stream or previously stored by the build service 312 or remote data storage service). For diff objects the build service 312 may generate the complete data object in order to calculate an index and/or identifier of the completed data object, where the index may be used by the developer 302 to later obtain the completed data object, as described above.

Furthermore, the storage calls may be distributed over various storage nodes or service backend 314 components. For example, the service backend 314 may include a plurality of data storage devices configured to process storage calls obtained from the service frontend 306. The service backend 314 may obtain a Bloom filter from a filter repository 322. The Bloom filter may enable the service backend to determine if a particular data object has been previously processed by the service and may delay processing of a data object if it depends on a data object not previously processed by the service. The filer repository 322 may contain Bloom filters, cuckoo filters, or other probabilistic data structures. Furthermore, the probabilistic data structures contained in the filter repository may be generated using information contained in an authoritative repository 324. The authoritative repository 324 may be a data store or database configured to store information corresponding to data objects store or otherwise processed by the build service 312.

The filter repository 322, in an embodiments, encodes past interactions with data objects (including diff objects and complete data objects) in a database, one or more Bloom filters and/or other probabilistic data structure (e.g., hash map), combination of database and one or more Bloom filters and/or other probabilistic data structure, or otherwise. A probabilistic data structure, in an embodiment, is a data structure configured such that, when maintained correctly, a query against the data structure (e.g., whether an element is in a set) has a non-zero probability of being incorrect (e.g., due to a hash collision). The filter repository 322 may be a local data storage system of the build service 312, may be operated by a separate service of the computing resource service provider 310 (or another provider or other entity), or otherwise. Note that the filter repository 322 may have data for multiple developers 302 or customers of the computing resource service provider 310 and, generally, multiple different identities. In this manner, the filter repository 322 can be checked for use of the same software development project when modified by different developers or other customers.

As yet another example, information about previous data objects received in a stream of data object may be encoded in the one or more Bloom filters. In one implementation, when a data object is received, for recording and checking, the data object (or a derivation thereof, such as a hash) and any reference data object (or multiple referenced data objects) may be canonicalized into information that is checked against and encoded into a Bloom filter. Information that is canonicalized for checking against and entry into the Bloom filter may also include the respective associated with the data object, or a derivation thereof, such as a hash of the data object. In alternate embodiments, multiple Bloom filters are used and cross referenced where all Bloom filters indicating a positive match indicates a particular data object has been previously processed by the build service 312. For instance, one Bloom filter may be used for encoding data objects for the entire software development project and another for encoding data objects received in a stream of data object associated with a particular request. Furthermore, if the number of data objects exceeds the size of a particular Bloom filter, multiple Bloom filters may be extended by at least computing the result of performing a logical disjunction of two or more Bloom filters. The logical disjunction may include an operation on two logical values, typically the values of two propositions, that has a value of false if and only if both of its operands are false.

Note that, when a Bloom filter or other probabilistic data structure is used, in some implementations, a determination that a data object has been previously processed may be incorrect due to potential for false positives. In some embodiments, the probabilistic data structure is configured such that the probability of a false positive is below a specified threshold to balance the computational efficiency provided by the data structure with the inconvenience caused by security actions that are unnecessarily performed as a result of a false positive. Other techniques to mitigate against false positives, such as by reference to a database only when data object references another data object that has been previously processed by the build service 312, may be used such that additional computing resources are used to make sure there was a pervious interaction only when the potential for generating a complete data object has been detected. In such scenarios, the authoritative repository may be queried or otherwise checked to determine if a false positive determination has occurred.

Figure 4:
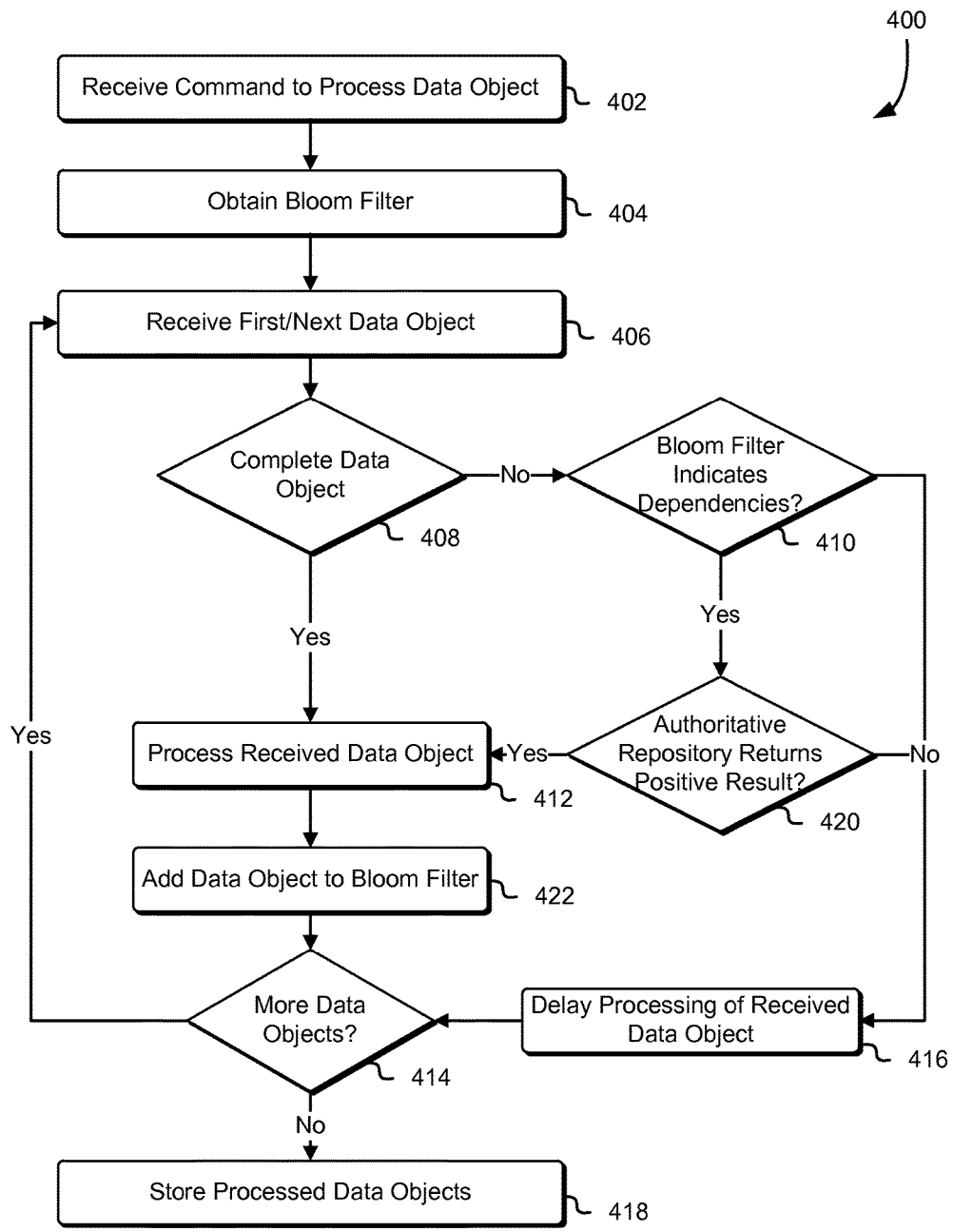
FIG. 4 shows an illustrative process for determining whether the data object has previously been processed in a stream of data objects in accordance with an embodiment in accordance with an embodiment.

FIG. 4 shows an illustrative example of a process 400 for processing a stream of data objects in accordance with an embodiment. The process 400 may be performed by any suitable system such as by a web server or a build service as described above. Generally, any computer system with access to information about previous interactions with data objects may perform the process 400 and variations thereof. In an embodiment, the system performing the process 400 receives a command to process a data object 402. The command may include a request to commit a software development project to a source code repository maintained by the build service as described above. In another example, the command may be a storage call submitted by a service front end of a build service to storage data objects generated by the build service.

The system performing the process 400 may then obtain a Bloom filter 404. The Bloom filter may be obtained from a filter repository or other storage device. Furthermore, the Bloom filter may include a collection of probabilistic data structures of databases as described above. The Bloom filters may encode data objects received by the build service and processed by the build service such that the data objects encoded in the Bloom filter may be used to generate complete data objects from diff objects. The system performing the process 400 may then receive the first/next data object 406. For example, the data objects may be transmitted in a stream of data objects to the system performing process 400. The stream of data object may include an unordered set of data objects and diff objects which references other data objects in the stream and/or other data objects included in the software development project.

The system performing the process 400 may then determine if the received first/next data object is a complete data object 408. If the received first/next data object is a complete data object, the system performing the process 400 may process the received first/next data object 412. For example, if the received first/next data object is a complete data object an identifier of the complete data object may be calculated and the complete data object may be stored or queued for storage once the process 400 is completed. If the received first/next data object is not a complete data object (e.g., a binary diff, delta encode object, or other diff object), the system performing the process 400 may pass information associated with the received first/next data object through the Bloom filter to determine if one or more data object referenced by the received first/next data object has previous been process by the system preforming the process 400. Once the data object has been process, the data object may be added to the Bloom filter 422. Adding the data object to the Bloom filter may include generating a hash of the data object as described above. Additionally, the data object may be added to a local Bloom filter associated with processing the stream of data objects.

If the Bloom filter returns a positive result indicating a dependencies with at least one other build object 410 (e.g., the data objects referenced by the diff object have been previous received in the stream of data objects), the system preforming the process 400 may query an authoritative repository to determine if the data object has been previously process 420. If the authoritative repository returns as positive result (e.g., the data object has previously processed by the system performing the process 400), the data object may be processed 412. If the authoritative repository returns a negative result, the system performing the process 400 may delay processing of the data object.

If the Bloom filter does not returns a positive result 410 (e.g., the data objects referenced by the diff object have not been previous received in the stream of data objects), the system preforming the process 400 may delay processing of the received first/next data object 416. Delaying processing of the request may enable the build service and/or system performing the process 400 to efficiently generate complete data objects by at least assuring that all reference data objects have been processed and may be used to generate the complete data object. If more data objects are to be process 414, the system performing the process 400 may receive the next data object 406. If there are no more data objects are to be process 414, the system performing the process 400 may store the processed data objects 418.

Figure 5:
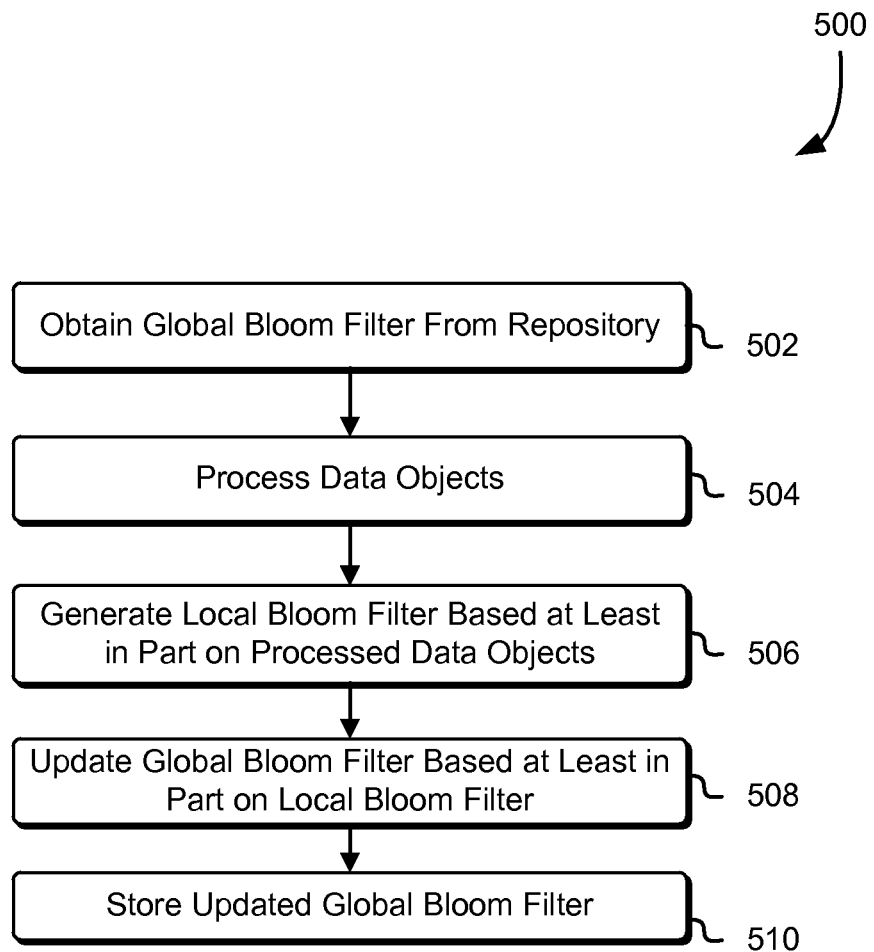
FIG. 5 shows an illustrative process for updating a Bloom filter used to determine whether the data object has previously been processed in a stream of data objects in accordance with an embodiment.

FIG. 5 shows an illustrative example of a process 500 for updating Bloom filters of a build service in accordance with an embodiment. The process 500 may be performed by any suitable system such as by a web server or an build service as described above. Generally, any computer system with access to information about previous interactions with data objects may perform the process 500 and variations thereof. In an embodiment, the system performing the process 500 obtains a global Bloom filter from a repository 502. The global Bloom filter may be a probabilistic data structure encoding all data objects the build service has obtained and/or processed on behalf of a developer or set of developer and corresponding to a particular software development project. The global Bloom filter may be generated based at least in part on information contained in an authoritative database as described above.

The system preforming the process 500 may then process a set of data objects 504. Processing the set of data objects may be performed in accordance with process 400 as described above in connection with FIG. 4. Processing the set of data objects may also include generation of the data object by the build service. While processing the set of data objects, the system performing the process 500 may generate a local Bloom filter based at least in part on the processed data objects of the set of data objects 506. For example, information corresponding to the data objects of the set of data objects may be used to generate a Bloom filter as described above. The local Bloom filter may then be used to update the global Bloom filter 508. Updating the global Bloom filter may include chaining or otherwise combining the global Bloom filter with the local Bloom filter. By updating the global Bloom filter any new data object processed when processing the set of data object may now be encoded in the Bloom filter. Once the global Bloom filter has been updated based at least in part on the local Bloom filter, the global Bloom filter and/or local Bloom filter may be store in the filter repository 510.

Figure 6:
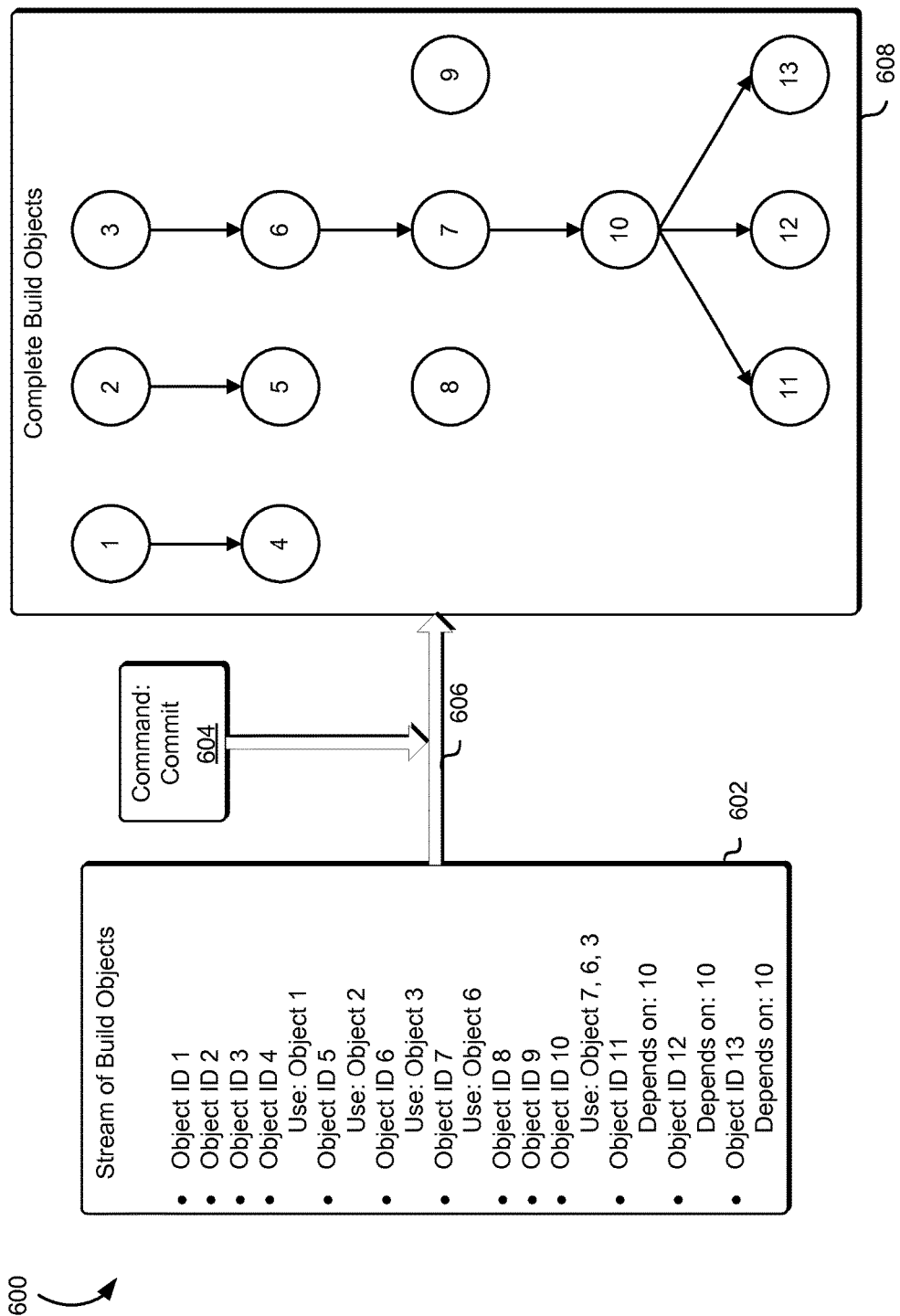
FIG. 6 is an environment illustrating a stream of data objects including data objects that reference other data objects in accordance with an embodiment.

FIG. 6 illustrates an example environment 600 where a complete data objects may be created based at least in part on a stream of data objects 602 and based at least in part on a received command from a developer to commit the data objects. The stream of data objects 602 and the command 604 may be received 606 by a build service or storage service as described above. In the example illustrated in FIG. 6, the command 604 is a command to commit to the stream of data objects 602 to a source code repository. The build service may create a set of complete data objects 608 based on the information in the stream of data objects 602 and on the command 604. For example, the build service may generate complete data objects based at least in part on data objects referenced by other data objects in order to store complete data objects and calculate identifiers of the complete data objects. In the set of complete data objects 608, the complete data objects may be created with identifiers corresponding to the ID of the data object. For example, the data object with ID 1, on the first line of the stream of data objects 602 corresponds to the complete data object labeled "1" in set of complete data objects 608. In the description of FIG. 6, a complete data object corresponding to one or more data objects with given IDs may be referred to simply as complete data object "ID" (so, for example, a complete data object corresponding to a data object with ID "1" and labeled as such may be referred to simply as complete data object "1").

In FIG. 6, complete data object "1" through complete data object "13" are a set of complete data objects 608 and may correspond to the data objects with ID 1 through ID 13. The reference that data object ID 4 has on data object ID 1 is illustrated with the directed edge between complete data object "1" and complete data object "4" and the dependency that data object ID 4 has on data object ID 2 is illustrated with the directed edge between complete data object "2" and complete data object "4." Therefore complete data object "4" is a diff object referencing data object 1 and data object 2. The directed edge between complete data object "1" and complete data object "4" and the directed edge between complete data object "2" and complete data object "4" indicates that data object ID 1 and data object ID 2 must be processed by the build service or other system before complete data object ID 4 may be created. The stream of data objects 602 and set of complete data objects 608 may also correspond to a particular version of the software development project or source code of the software development project. The build service may also cache previous versions of data objects and used the previously cached data objects to more efficiently generate complete data objects. The complete data objects may be generated based at least in part on changes to the source file associated with the previously processed data objects.

Figure 7:
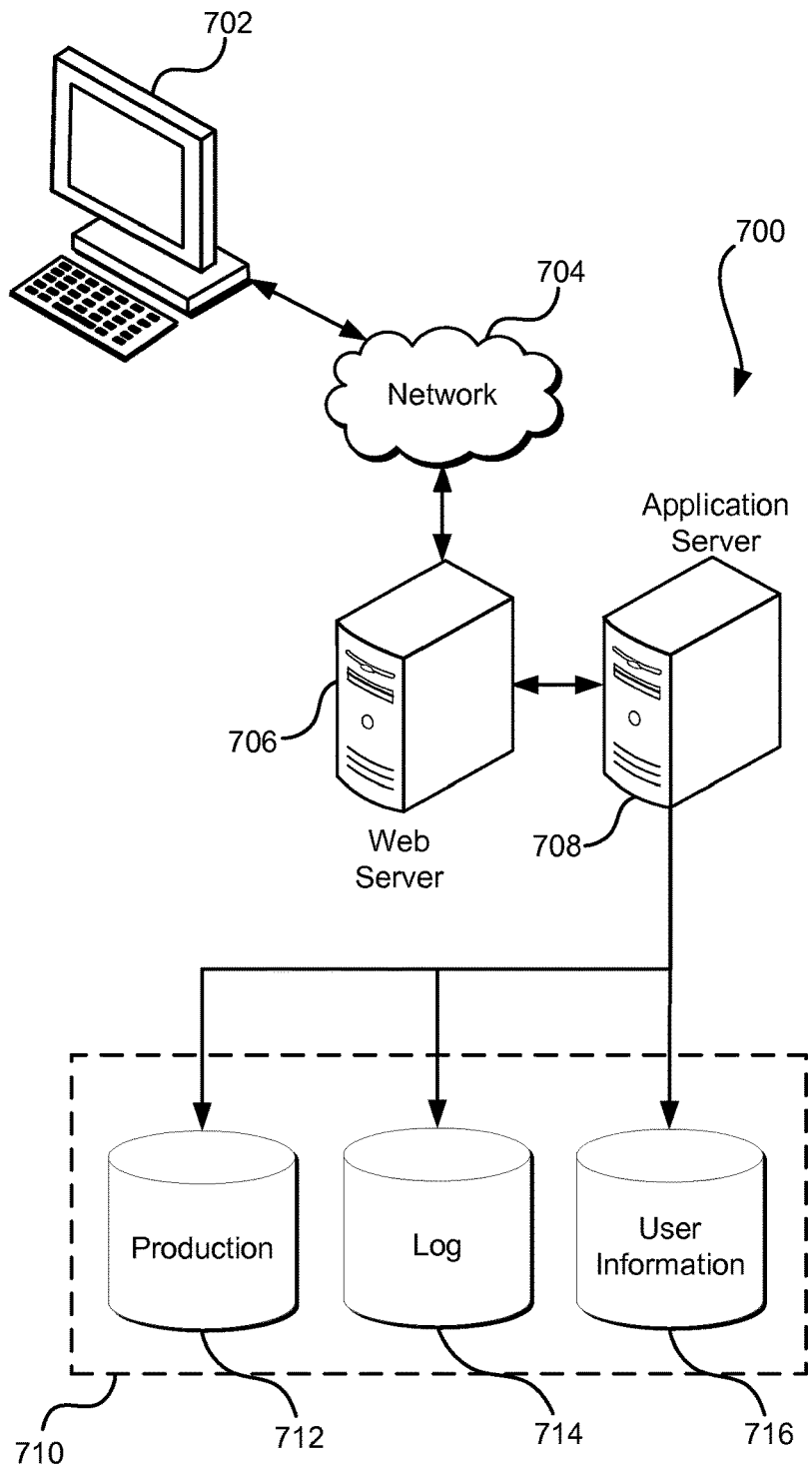
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising: under the control of one or more computer systems configured with executable instructions,
receiving a stream of data objects associated with a software development project, where the stream of data objects includes complete data objects and diff objects which reference at least one complete data object;
obtaining a Bloom filter from a filter repository maintained by a build service;
for each diff object included in the stream determining a set of referenced data objects:
determining that at least one referenced data object of the set of referenced data objects has yet not been received in the stream of data object by at least querying the obtained Bloom filter for the set of referenced data objects;
delaying processing of the diff object until the set of referenced data objects has been received;
generating a complete data object based at least in part on the set of referenced data objects; and
generating an identifier for each data object of the stream of data objects, where the identifier is useable to retrieve a particular data object and generated based at least in part on complete build objects; and
storing the stream of data objects.

2. The computer-implemented method of claim 1, wherein processing the stream of data objects further comprises generating a local Bloom filter associated with the stream of data objects based at least in part on an identifier of each data object included in the stream of data objects.

3. The computer-implemented method of claim 2, wherein the computer-implemented method further comprises updating the Bloom filter with the local Bloom filter based at least in part on a logical disjunction of the Bloom filter and the local Bloom filter.

4. The computer-implemented method of claim 3, wherein the computer-implemented method further comprises storing the updated Bloom filter in a storage service accessible to the one or more computer systems to process additional streams of data objects.

5. A system, comprising:
memory to store executable instructions that, if executed by one or more processors of the system, cause the system to:
in a stream of data objects, receive a set of data objects including complete data objects and diff data objects that reference one or more other data objects;
use a probabilistic data structure to determine whether a subset of diff objects of the set of data objects references at least one other data object of the set of data objects that has not been processed by the system;
delay processing of the subset of diff objects of the set of data objects;
after delaying processing of the subset of diff objects, determine the set of data objects has been processed by the system;
process the subset of diff objects; and
update the probabilistic data structure with an outcome of processing the subset of diff objects.

6. The system of claim 5, wherein the stream of data objects further comprises an unordered stream of data objects received in response to a command to commit one or more data objects to a repository.

7. The system of claim 5, wherein the probabilistic data structure further comprises a Bloom filter configured to determine whether one or more data objects referenced by a particular diff object is a member of the set of data objects that have been previously processed by the set of computing devices.

8. The system of claim 5, wherein processing the subset of diff objects further comprises generating a set of complete data objects from the set of data objects that reference at least one other data object of the set of data objects.

9. The system of claim 8, wherein processing the subset of diff objects further comprises generating a set of identifiers corresponding to the set of complete data objects, wherein the set of identifiers is configured to enable retrieval of a particular complete data object of the set of complete data objects.

10. The system of claim 5, wherein the instructions, if executed, further cause the system to query an authoritative database to determine if the probabilistic data structure has returned a false positive associated with the determine subset of diff objects of the set of data objects that reference the at least one other data object of the set of data objects.

11. The system of claim 5, wherein the instructions, if executed, further cause the system to update the probabilistic data structure based at least in part on the stream of data objects.

12. The system of claim 5, wherein the instructions, if executed, further cause the system to store the processed subset of diff objects such that the processed subset of diff objects and complete data objects included in the stream of data objects are accessible by a customer associated with a software development project.

13. A non-transitory computer-readable storage medium having stored thereon executable instructions that, if executed by one or more processors of a computer system, cause the computer system to at least:
obtain a diff object from a set of data objects that references one or more other data objects:
determine the one or more other data objects of the set of data objects from which the diff object depends;
use a probabilistic data structure to obtain information corresponding to the one or more other data objects, wherein the probabilistic data structure probabilistically indicates whether the computer system has previously interacted with a particular data object based at least in part on an identifier of the particular data object;
delay processing of the diff object based at least in part on the obtained information; and
update the probabilistic data structure with an outcome of processing the diff object.

14. The non-transitory computer-readable storage medium of claim 13, wherein the instructions further comprise instructions that, if executed by the one or more processors, cause the computer system to generate the probabilistic data structure based at least in part on an authoritative database containing information corresponding to the set of data objects.

15. The non-transitory computer-readable storage medium of claim 13, wherein the instructions further comprise instructions that, if executed by the one or more processors, cause the computer system to reorder processing of the diff object and the one or more data objects based at least in part on the obtained information.

16. The non-transitory computer-readable storage medium of claim 13, wherein the instructions further comprise instructions that, if executed by the one or more processors, cause the computer system to:
   generate a complete data object based at least in part on the diff object and at least one other data object of the one or more data objects; and
   determine an identifier of the complete data object.

17. The non-transitory computer-readable storage medium of claim 16, wherein the instructions further comprise instructions that, if executed by the one or more processors, cause the computer system to store the complete data object such that the complete data object is obtainable based at least in part on the identifier of the complete data object.

18. The non-transitory computer-readable storage medium of claim 13, wherein the instructions further comprise instructions that, if executed by the one or more processors, cause the computer system to receive a command to commit the set of data objects to a source code repository associated with a software development project.

19. The non-transitory computer-readable storage medium of claim 18, wherein the instructions that update the probabilistic data structure further comprise instructions that, if executed by the one or more processors, cause the computer system to add an element to the probabilistic data structure associated with the diff object based at least in part on a hash of the diff object.

20. The non-transitory computer-readable storage medium of claim 19, wherein the instructions further comprise instructions that, if executed by the one or more processors, cause the computer system to update a Bloom filter based at least in part on the probabilistic data structure.

* * * * *